Figure 1A:
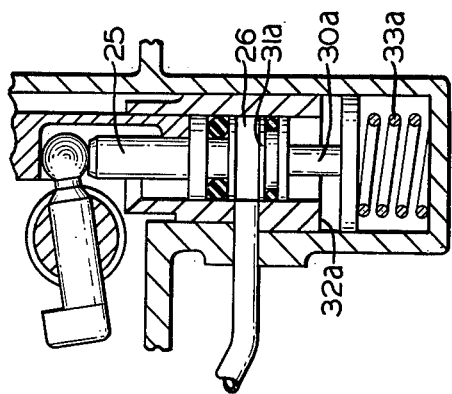

United States Patent [19]

Reinecke

[11] 4,109,969

[45] Aug. 29, 1978

[54] AUTOMATIC LOAD-DEPENDENT BRAKE POWER REGULATOR FOR VEHICLES

[75] Inventor: Erich Reinecke, Beinhorn, Fed. Rep. of Germany

[73] Assignee: WABCO Westinghouse GmbH, Hannover, Fed. Rep. of Germany

[21] Appl. No.: 798,418

[22] Filed: May 18, 1977

[30] Foreign Application Priority Data

May 21, 1976 [DE] Fed. Rep. of Germany ....... 2622797

[51] Int. Cl.² ............................................. B60T 8/18
[52] U.S. Cl. .................................. 303/22 R; 188/195; 303/23 R
[58] Field of Search ................ 303/22 R, 23 R, 23 A; 188/195; 137/627.5, 596

[56] References Cited

U.S. PATENT DOCUMENTS

| 3,228,731 | 1/1966 | Valentine | 303/22 R |
| 3,302,982 | 2/1967 | Pekrul | 303/22 R |

*Primary Examiner*—Trygve M. Blix
*Assistant Examiner*—Reinhard J. Eisenzopf
*Attorney, Agent, or Firm*—R. W. McIntire, Jr.

[57] ABSTRACT

The invention relates to an automatic load-dependent brake power regulator for motor vehicles and trailers in which the regulator automatically assumes a condition to provide a braking force for a half-loaded vehicle in the event the regulator control linkage between the regulator and vehicle axle should break.

6 Claims, 2 Drawing Figures

AUTOMATIC LOAD-DEPENDENT BRAKE POWER REGULATOR FOR VEHICLES

BACKGROUND OF THE INVENTION

Automatic load-dependent brake power regulators are used to adjust the brake pressure in the brake cylinders to the respective load condition of a vehicle. This adjustment takes place automatically in that the respective spring deflection which is dependent upon the axle load or, in the case of vehicles having an air-suspension system, the pressure in the respective air spring bellows which is dependent upon the axle load, adjusts, by means of the brake power regulator, the amount of the brake pressure which is controlled by the motor-vehicle brake valve or, in the case of trailers, by the trailer brake valve.

An automatic load-dependent brake power regulator of the type broadly described above has been proposed in which the brake power regulator is fastened to the vehicle framework and is connected, via a mechanical transmission system comprised of levers and rods, with a metal bellows mounted on the axle. If now there should occur a break at any point in the transmission system, then, due to the weight of the lever and the possibly remaining rod parts, the lever drops down and, when operating the service brake system, the vehicle is braked with a braking force as controlled for an unloaded vehicle, which means insufficient braking in case the vehicle is fully loaded.

There are known types on which, in the event of a break in the transmission system, a spring pulls up the lever of the brake power regulator to the "fully-loaded" position. However, this has the reversed effect of braking an empty vehicle with the braking force as controlled for a fully loaded vehicle, which means excessive braking of the wheels thus causing them to lock. In addition, such a draw spring — particularly in the case of two-axle assemblies having a stable, relatively heavy linkage system between the two axles — must be comparatively strong, which is undesirable considering the great possibility that it influences the regulator.

In some countries the dangers described above have been recognized and, therefore, in the European Community it is required that in the event of a breakdown of a valve arrangement which regulates the braking force or of its actuating device, it must be possible to keep a motor vehicle under the conditions as required for auxiliary braking, while for trailers at least 30% of the prescribed service braking effect must be reached.

Since, however, these values as prescribed can be reached only if, in the event of a break in the transmission system, the lever of the brake power regulator is automatically shifted to the "half-loaded" position, the object of the invention is to provide a control mechanism which meets these requirements. This means that a fully loaded vehicle is braked with slightly less force and an empty vehicle is braked with slightly more force. With this solution, which is a compromise, the auxiliary braking action in the case of motor vehicles and 30% of the service braking action in the case of trailers is reached as required by the guidelines of the legislators.

Figure 1:
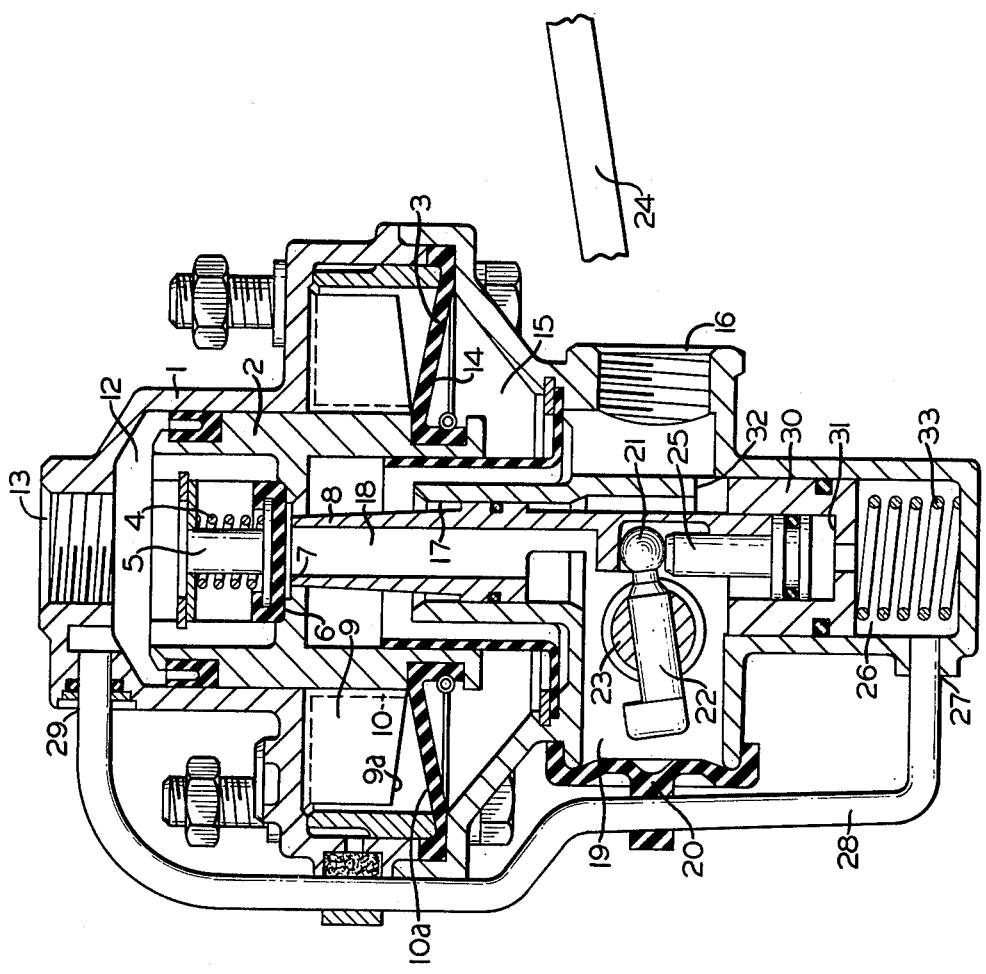

The construction and operation of an automatic load-dependent regulator with control mechanisms of different design in accordance with the invention are further explained hereinafter with reference to the drawing, in which:

FIG. 1 is a cross-sectional view of an automatic load-dependent brake power regulator for vehicles showing my invention, and FIG. 1a is a cross-sectional view of a portion of the device of FIG. 1 showing a modification.

In the upper part of the housing 1 there is disposed a stepped piston, comprised of a piston 2 and a diaphragm 3, which within the inner space of the piston 2 has a two-way valve body 5 which is under the tension of a spring 4 and which forms, in conjunction with a valve seat 6 located on the inner wall of the piston 2, an inlet valve 5, 6 and, in conjunction with the upper end face — which is in the form of a valve seat 7 — of a valve stem 8 located underneath the two-way valve body 5, an outlet valve 6, 7. Connected to the piston 2 there are a number of radial fins 9 whose areas 9a, facing the diaphragm 3, form parts of a conical casing.

In the housing 1 there are provided a number of radial, stationary fins 10 in the interspaces of which the fins 9 are fitted without making contact and the areas 10a of which, facing the diaphragm 3, form parts of an opposed conical casing. In the position as shown in the figure the diaphragm 3 abuts against these faces 10a.

The outer edge of the diaphragm 3 is fixed to the housing 1 and its inside edge to the piston 2, Thus is formed the stepped piston 2, 3 whose upper working surface forming the wall of a chamber 12, which is located above the piston 2 and communicates with a compressed-air connection 13 establishing a connection with the motor-vehicle brake valve or trailer brake valve, is invariable and whose lower working surface 14 forming the wall of a chamber 15 which is located underneath the diaphragm 3 and communicates with a connection 16 leading to the brake cylinders, changes as the stepped piston 2, 3 moves.

A central bore 17 in the housing 1 carries the partially hollow valve stem 8 whose upper end face forms — as already indicated — the outlet valve seat 7, air being removed from its hollow space 18 via a chamber 19 and an air escape 20. The valve stem 8 is tensionally connected with the ball end 21 of a lever 22 which is supported by the journal of a shaft 23. The shaft 23 is connected with the vehicle axle via a lever 24 through the intermediary of a rod system and a metal bellows.

The housing carries a compensating piston 25 which is coaxial to the valve stem 8 and whose upper piston end supports the ball end 21, thus compensating for the forces acting downwardly upon the ball end 21. The chamber 26 is located beneath the compensating piston 25 communicates with the chamber 12 through a connection 27, a connecting pipe 28 and a connection 29.

According to the invention there is provided underneath the compensating piston 25 an annular piston 30 which, in relation to the compensating piston 25, has a slip connection 31. In addition, there is provided for this control piston 30, which is designed as an annular piston, in the direction of movement towards the "located" position, at the point of the "half-loaded" position, a stop 32 which is fixedly attached to the housing.

Now follows a general description of the operation of the automatic load-dependent brake power regulator while, following this description, the device of the invention will be further elaborated on.

In the empty condition there is the greatest distance between the axle and the brake power regulator, and the lever 24 is in its lowest position, which means that the brake pressure coming from the motor-vehicle brake valve or from the trailer control valve flows at its lowest level.

If the vehicle is loaded, the distance between brake power regulator and axle becomes smaller, and as a result the lever 24 swings upwardly in the direction of more power. A horizontal position of the lever 24 approximately corresponds to a braking force as needed for a half-loaded vehicle. In its highest position the brake pressure coming from the motor-vehicle brake valve or from the trailer control valve is fully transmitted.

A brake pressure coming from the motor-vehicle brake valve or from the trailer control valve reaches the chamber 12 via the connection 13 and pushes the piston 2 downwards. The valve stem 8 is then pushed downwards as well, by the two-way valve body 5, until it comes to rest on the ball end 21 and, when the piston 2 moves further downwards, the valve 5, 6 opens. The compressed air can now flow via the connection 16 into the brake cylinders as well as into the chamber 15 underneath the diaphragm 3.

Via the connecting pipe 28 and the connection 27, the compressed air supplied to the device has reached simultaneously the chamber 26 underneath the piston 26 and, in the embodiment according to FIG. 1, also underneath the annular piston 30, the piston 25 supporting the ball end 21.

During the downward movement the diaphragm 3 moves away from the fin 10 situated in the regulator housing 1 and comes more and more into position against the fins 9 of the piston 2. Thus, the effective diaphragm surface is steadily enlarged until it outbalances the surface area of the upper side of the piston. As a result, the piston 2 moves upwards again and the valve 5, 6 is closed. A braking-ended position has been reached. The pressure now prevailing in the brake cylinders corresponds to the pressure as controlled in accordance with the weight of load.

After suspending the brake pressure, the compressed air in the brake cylinders moves the piston 2 to its upper end position and escapes to the atmosphere via the outlet valve 6, 7 through the bore 18 in the valve stem 8 and via the chamber 19 through the air escape 20.

If now the lever 24 or any part in the transmission rod system should break, then the part still remaining on the brake power regulator could swing freely with the shaft 23 and the lever 22, and, due to the free movability of the ball end 21, the valve stem 8 would — when braking the vehicle, whether loaded or empty — fully slide down, assisted by the weight of the remaining lever parts, which means that merely the brake pressure for an empty vehicle flows into the brake cylinders of a fully loaded vehicle.

On account of the arrangement according to the invention of a control mechanism in the form of an annular piston 30, which is provided with a slip connection 31 and which is located underneath the compensating piston 25, and on account of the arrangement of a common pressure chamber 26 for the compensating piston 25 and the annular piston 30, when effecting a braking effort, the upward movement of the compensating piston 25, acted upon by the weight of the rod parts which remain after breaking, is assisted — as a result of the pressure coming from the motor-vehicle brake valve or from the trailer control valve and building up in said chamber 26 via the connecting pipe 28 — by the annular piston 30 with the slip connection 31, the upward movement of said annular piston being limited by means of a stop 32 in the "half-loaded" position.

As a further refinement of the invention it is possible to additionally provide, beneath the annular piston 30 a compression spring 33 which assists the displacement force in the direction of "half-loaded." This spring 33 acts upon the annular piston 30 and thus upon the control mechanism until the annular piston 30 is stopped on the side of the housing in the "half-loaded" position.

In the case of the control mechanism shown in FIG. 1a, which represents another form of the invention, the control piston 30a moves upwards, until reaching the stop 32a of the "half-loaded" position, without the assistance of compressed air, merely by the action of a spring 33a located beneath the piston 30a, while taking along by means of its upper piston face 31a the compensating piston 25 which is in its lowest position.

Having now described the invention, what I claim as new and desire to secure by Letters Patent, is:

1. Automatic load-dependent brake power regulator for motor vehicles and trailers having a stepped piston disposed in the upper part of the regulator housing and having a two-way valve body which is freely coxially movable in the hollow space of the stepped piston and forms, in conjunction with a valve seat fixed to the piston, an inlet valve and which is operatively connected with a valve stem coaxially disposed thereunder whose upper end face forming the operative connection forms, in conjunction with the two-way valve body, an outlet valve and whose lower end is tensionally connected with the ball end of a rotatably supported control lever whose position is determined by the load of the vehicle, as well as having a compensating piston (25) which, disposed in the lower part of the regulator housing, supports the ball end of the control lever and is acted upon by the brake pressure controlled by the motor-vehicle brake valve or by the trailer control valve, characterized in that in the lower part of the regulator housing (1) there is provided beneath the compensating piston (25) an annular piston (30) which is provided with a slip connection (31) and can be acted upon by compressed air in the direction of movement of the compensating piston (25).

2. Automatic load-dependent brake power regulator according to claim 1, characterized in that the compensating piston (25) and the annular piston (30) are associated with a common compressed-air chamber (26).

3. Automatic load-dependent brake power regulator according to claim 1, characterized in that fixedly attached to the regulator housing (1) there is provided a stop for limiting the upward movement of the annular piston (30) in the "half-loaded" position.

4. Automatic load-dependent brake power regulator according to claim 1, characterized in that there is provided a spring resting upon the bottom of the regulator housing (1) and pushing against the underside of the annular piston (30).

5. Automatic load-dependent brake power regulator according to claim 1, charcterized in that the upper face (31a) of a piston (30a), disposed in the lower pressureless part of the regulator housing (1) and being under the tension of a spring (33a), forms an operative connection with the compensating piston (25).

6. Automatic load-dependent brake power regulator according to claim 1, characterized in that there is provided in the regulator housing (1) a stop (32a), fixed to the housing, for stopping the upward movement of the piston (30a) in the "half-loaded" position.

* * * * *